May 28, 1957

J. W. JONES, JR 2,794,167

TESTER

Filed Aug. 7, 1956

John W. Jones, Jr.
INVENTOR.

BY *Clarence A. O'Brien*
*and Harvey B. Jackson*
Attorneys

United States Patent Office 2,794,167
Patented May 28, 1957

2,794,167

TESTER

John W. Jones, Jr., Shelton, Conn.

Application August 7, 1956, Serial No. 602,615

6 Claims. (Cl. 324—53)

This invention relates to the class of electrical testing apparatus and more particularly to a portable tester especially adapted for use in testing the condition of fuses without removing fuses from a fuse block or fuse holder.

The primary object of the present invention resides in the provision of a test device for testing cartridge and knife blade types of fuses without removing the fuses from the switch or fuse block in which they are utilized. Most modern fused switches must be in the off position before the fuses are exposed for test. This makes a voltmeter or ohmmeter test for blown fuses very difficult, awkward and presents certain safety hazards. The removal and subsequent continuity test of fuses is time consuming and confusing. The present invention provides a portable testing device which enables a one hand test of fuses which is not only quicker but is also safer.

A further object of the present invention resides in the provision of a fuse tester which can readily duplicate as a flashlight.

Another object of the present invention resides in the provision of a testing device adapted for use in testing the continuity of circuits and determining the presence of a voltage in a circuit.

Still further objects and features of this invention reside in the provision of a tester that is simple in construction, efficient in use, and which employs a novel arrangement for mounting of test probes so that when the test probes are not in use they are concealed and safeguarded within suitable grooves provided in the insulative casing, the test probes being covered with sheaths of electrically insulative material which reduces the possibility of accidental engagement of the test probe with conductive material.

These, together with the various ancillary objects and features of the invention which will become apparent as the following description proceeds, are attained by this tester, a preferred embodiment of which has been illustrated in the accompanying drawings, by way of example only, wherein.

Figure 1:
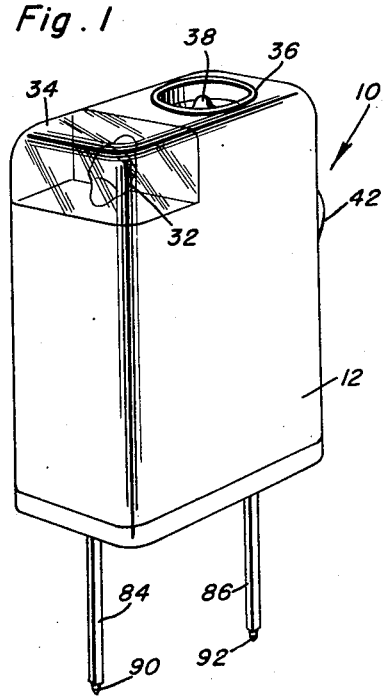
Figure 1 is a perspective view of the tester.

With continuing reference to the accompanying drawings wherein like reference numerals designate similar parts throughout the various views, reference numeral 10 generally designates the tester comprising the present invention. This tester includes a casing 12 formed from any suitable insulative material such as any of the commercially available synthetic plastic materials. The casing 12 may be made in any number of suitable parts for ease of fabrication and may include a base 14 having recesses or grooves 16 and 18 therein. Further, the casing 14 may include a main body portion 20 having intersecting bores 22 and 24 extending therethrough and normal to each other through which various conductors pass. The upper portion of the main body portion 20 is provided with two recesses 26 and 28. Disposed in the first recess 26 is a lamp socket 30 and disposed in the recess 28 is a gaseous discharge lamp such as a neon lamp 32. A cover plate 34 of transparent material encases the neon lamp 32 in the recess 28. Disposed in the recess 26 is an angulated ring 36 of translucent or transparent material, colored as desired, to render light emanating from the lamp bulb 38 receivable in the socket 30 visible throughout a greater range. The ring 36 may be bonded, swaged or press fitted in position.

The casing body portion 20 is provided with a slot 40 in the side thereof through which a movable switch member 42 extends. This movable switch member 42 carries a switch block 44 with a contact member 46 as well as opposed pairs of contacts 48, 50 and 52, 54 carried thereby. The contact 46 serves to bridge contacts 56 and 58 while the pair of contacts 48 and 50 may engage contacts 56 and 58 in another position of the switch. The contacts 52 and 54 in this position will engage contacts 62 and 64 on conductors 66 and 68.

Figure 2:
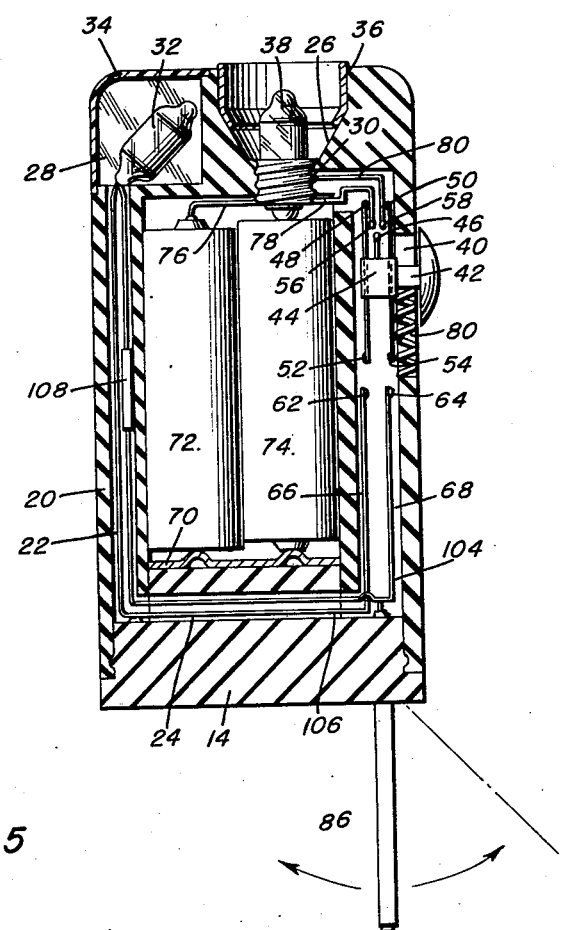
Figure 2 is an enlarged transverse sectional detail view of the tester illustrating the device with one of the test probes in a folded position and the other test probe in an extended position.
Figure 5:
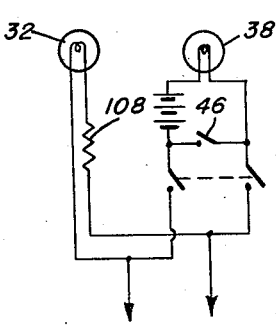
Figure 5 is a schematic wiring diagram illustrating the arrangement of the circuits utilized in the invention.
Figure 4:
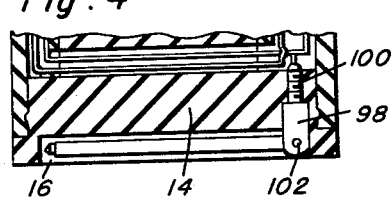
Figure 4 is a partial sectional detail view illustrating a test probe in a folded position.
Figure 3:
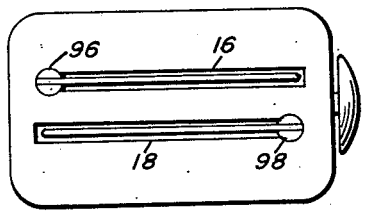
Figure 3 is a bottom plan view of the tester.

Mounted in the casing 12 is a contact plate 70 bridging the pair of battery cells 72 and 74 which are arranged in series connection. A conductor 76 is connected to the lamp socket 30 and battery cell 72 to contact 56. Another conductor 78 is also connected to the lamp socket 30 and to contact 56. Conductor 80 is connected to contact 58 and to the lamp socket 30 so that when the contact 46 bridges the contacts 56 and 58 when the switch member 42 is in a raised position, an operative electrical circuit through the batteries 72 and 74 to the lamp bulb 38 will be attained thus allowing the device to be used readily as a flashlight. In the position as is shown in Figure 2, the switch member 42 is urged by means of a spring 81 to an off position. However, when the switch member 42 is lowered against the force exerted by the spring 80 into a lowered position, the contacts 48 and 50 will engage contacts 56 and 58 and the contacts 52 and 54 will engage the contacts 62 and 64. In this position, the test probes 84 and 86 may be utilized. These test probes are formed of an electrically conductive material and have pointed ends as at 90 and 92 and are covered with a sheathing of insulative material. The contact probes are secured to the bifurcated ends of studs 96 and 98 which have threaded ends as at 100 threadedly secured in the base 14 of the casing 12 with the bifurcated ends of the studs extending into the recesses 16 and 18. Set-screws or other suitable fasteners as at 102 are used to hold the test probes 84 and 86 frictionally in an adjusted position. Of course, the test probes 84 and 86 may be pivoted into the recesses 16 and 18 thus concealing the test probes when not in use while also providing a completely insulated hand flashlight, the pointed ends of the test probes being folded out of contact. Conductors as at 104 and 106 are connected to the contacts 62 and 64 and to the test probes 86 and 84, respectively. Also connected to the conductors 104 and 106 is the neon lamp 32 with a resistor of considerable magnitude as indicated at 108 in series with the lamp 32. Hence, with the switch member 42 in the last recited position, and with the test probes 84 and 86 electrically in contact with a conductor, an operative electrical circuit through the test probes to the contacts 48 and 50 to the lamp 38 is achieved. If there is current of suitable magnitude in the conductor, the lamp 32 will be excited.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention as claimed.

What is claimed as new is as follows:

1. An electrical testing device comprising an insulative casing, at least one battery cell within said casing, a lamp socket in said casing, a conductor connected to said battery and said lamp socket, an incandescent filament lamp disposed in said socket, a gaseous discharge lamp in said casing, a pair of grooves in said casing, a pair of studs secured in said casing extending into said grooves, a pair of test probes pivotally secured to said studs and foldable into said grooves, conductors connected to said studs and said gaseous discharge, and switch means on said casing for selectively connecting said filament lamp to said battery and said test probes, and said filament lamp and said gaseous discharge lamp to said test probes.

2. An electrical testing device comprising an insulative casing, at least one battery cell within said casing, a lamp socket in said casing, a conductor connected to said battery and said lamp socket, an incandescent filament lamp disposed in said socket, a gaseous discharge lamp in said casing, a pair of grooves in said casing, a pair of studs secured in said casing extending into said grooves, a pair of test probes pivotally secured to said studs and foldable into said grooves, conductors connected to said studs and said gaseous discharge lamp, and switch means on said casing for selectively connecting said filament lamp to said battery and said test probes, and said filament lamp and said gaseous discharge lamp to said test probes, said studs having threaded inner ends threadedly secured in said casing, said studs having bifurcated outer ends, and fasteners extending through said test probes and said bifurcated outer ends frictionally holding said test probes in a pivotally adjusted position.

3. An electrical testing device comprising an insulative casing, at least one battery cell within said casing, a lamp socket in said casing, a conductor connected to said battery and said lamp socket, an incandescent filament lamp disposed in said socket, a neon lamp in said casing, a pair of grooves in said casing, a pair of studs secured in said casing extending into said grooves, a pair of test probes pivotally secured to said studs and foldable into said grooves, conductors connected to said studs and said neon lamp, and switch means on said casing for selectively connecting said filament lamp to said battery and said test probes, and said filament lamp and said neon lamp to said test probes, said studs and said test probes being formed of an electrically conductive material, said test probes being mainly covered with sheaths of electrically insulative material.

4. An electrical testing device comprising an insulative casing, at least one battery cell within said casing, a lamp socket in said casing, a conductor connected to said battery and said lamp socket, an incandescent filament lamp disposed in said socket, a neon lamp in said casing, a pair of grooves in said casing, a pair of studs secured in said casing extending into said grooves, a pair of test probes pivotally secured to said studs and foldable into said grooves, conductors connected to said studs and said neon lamp, and switch means on said casing for selectively connecting said filament lamp to said battery and said test probes, and said filament lamp and said neon lamp to said test probes, and a resistor connected in series connection between said neon lamp and said test probes.

5. An electrical testing device comprising an insulative casing, at least one battery cell within said casing, a lamp socket in said casing, a conductor connected to said battery and said lamp socket, an incandescent filament lamp disposed in said socket, a neon lamp in said casing, a pair of grooves in said casing, a pair of studs secured in said casing extending into said grooves, a pair of test probes pivotally secured to said studs and foldable into said grooves, conductors connected to said studs and said neon lamp, and switch means on said casing for selectively connecting said filament lamp to said battery and said test probes, and said filament lamp and said neon lamp to said test probes, and a resistor connected in series connection between said neon lamp and said test probes, said studs having threaded inner ends threadedly secured in said casing, said studs having bifurcated outer ends, and fasteners extending through said test probes and said bifurcated outer ends frictionally holding said test probes in a pivotally adjusted position.

6. An electrical testing device comprising an insulative casing, at least one battery cell within said casing, a lamp socket in said casing, a conductor connected to said battery and said lamp socket, an incandescent filament lamp disposed in said socket, a neon lamp in said casing, a pair of grooves in said casing, a pair of studs secured in said casing extending into said grooves, a pair of test probes pivotally secured to said studs and foldable into said grooves, conductors connected to said studs and said neon lamp, and switch means on said casing for selectively connecting said filament lamp to said battery and said test probes, and said filament lamp and said neon lamp to said test probes, and a resistor connected in series connection between said neon lamp and said test probes, said studs having threaded inner ends threadedly secured in said casing, said studs having bifurcated outer ends, and fasteners extending through said test probes and said bifurcated outer ends frictionally holding said test probes in a pivotally adjusted position, said studs and said test probes being formed of an electrically conductive material, said test probes being mainly covered with sheaths of electrically insulative material.

References Cited in the file of this patent

UNITED STATES PATENTS

| | | |
|---|---|---|
| 2,324,661 | Woodington | July 20, 1943 |
| 2,564,166 | Marinello | Aug. 14, 1951 |
| 2,607,829 | Tipperman | Aug. 19, 1952 |